3,048,884
FISH SCALER
Arthur L. Robichaux, 1402 Bordeaux St., New Orleans, La.
Filed Apr. 5, 1960, Ser. No. 20,169
7 Claims. (Cl. 17—7)

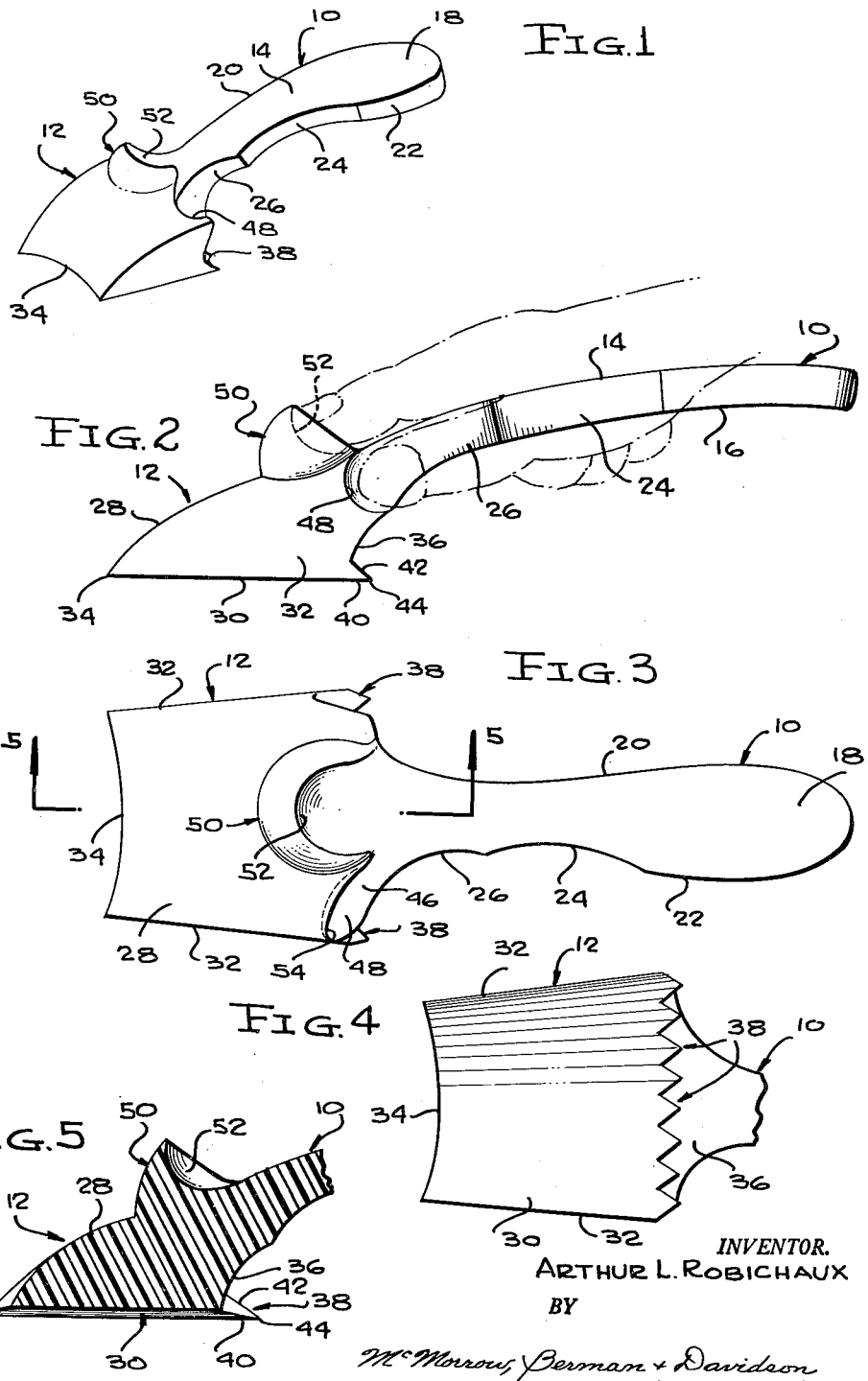

This invention relates to a novel and improved device for loosening and then removing scales from fish.

The primary object of the invention is the provision of a quicker-acting, more efficient, and safer device of the kind indicated, which is easier to use and which substantially reduces the time and effort required by present fish scalers.

Another object of the invention is to provide a compact and relatively small-sized device of the character indicated above, which can be formed as a single piece of formed material, and which comprises a handle to be grasped in a hand, and a head on one end of the handle, the head having thereon a thumb seat and guard, and the handle having thereon, an index finger seat and guard.

A further object of the invention is the provision of a device of the character indicated above, wherein the head has a transverse row of scale-loosening teeth on its inward or rearward side, for loosening scales of a fish preliminary to removal of the scales, and a transverse scale-removing blade on its outer or forward side, each capable of use without removing or reversing the device in the hand.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a device of the invention;

FIGURE 2 is an enlarged side elevation of the device, with a hand of a user applied thereto;

FIGURE 3 is a top plan view of FIGURE 2;

FIGURE 4 is a fragmentary bottom plan view of the device; and,

FIGURE 5 is a fragmentary vertical longitudinal section taken on the line 5—5 of FIGURE 3.

Referring in detail to the drawings, wherein like numerals designate like parts throughout the several views, the illustrated device comprises a longitudinally elongated, relatively short, rigid handle 10 on whose forward end is fixed a rigid head 12. The device can be made of any suitable material or materials, but is preferably a monolithic or one-piece form, as shown in the drawings, and cast or otherwise formed from lightweight metal or plastic, having the required rigidity and hardness and being solid, as shown.

The handle 10 is straight and longitudinally and upwardly bowed and flat, having a convex upper surface 14 and a substantially parallel undersurface 16, and a spatula-shaped rear end portion 18. The handle 10 has a slightly longitudinally and inwardly curved right-hand side edge 20, and a multi-curved left-hand side edge 22, these side edges, at their forward ends, being outwardly flared into the head 12. The side edges 20 and 22 would be reversed in the case of a device for use by a left-handed user. The left-hand side edge 22 has, at an intermediate point thereof, an intermediate concavity 24, and, at its forward end, a forward concavity 26, for the reception of fingers of the user, while the convex upper surface 14 is engaged by the palm of the hand, as shown in FIGURE 2. The forward concavity 26 is a part of a thumb rest and guard on the head 12.

The head 12 is wider than and is centered with respect to the longitudinal axis of the handle 10, and has a segmental cross-section, involving a forwardly and downwardly angled, and preferably convexly curved top surface 28, a transversely and concavely curved bottom surface 30, and slightly forwardly converged flat sides 32. The top surface 28 and the bottom surface 30 meet, at the forward extremity of the head, in a sharp, concavely curved fish scale removing edge 34.

On the rear of the head 12 is a transverse concavity 36, at and along whose lower edge are rearwardly projecting, and rearwardly tapered, transversely spaced fish-scale loosening teeth 38, which are acute triangular shapes and have base sides 40 disposed substantially on a level with the bottom surface 30 of the head, and rearwardly declining sides 42 which meet the base sides 40, and define sharp points 44 at the rear ends of the teeth 38.

The flared forward end of the handle 10 merges, at a forward and downward angle, into the rear of the head 12, at a location above the rear concavity 36. The left-hand side of the flared forward end of the handle 10 is longitudinally concaved, as indicated at 46, at the forward end of the forward concavity 26 of the handle 10, and the concavity 46 merges into a laterally outwardly extending and forwardly indented thumb recess or socket 48.

Upstanding centrally on the rear of the top surface 28 of the head 12 is a segmental boss 50, having a forwardly and upward angled index finger socket or recess 52 in its rear side. The outer sidewall 54 of the thumb socket 48 acts as a guard for a thumb engaged therein, against injurious contact with the thumb, of fish scales as the device is used for removing scales from a fish. The sidewalls of the index finger socket 52, and the boss 50 itself, serves as guards against injurious contact of fish scales with the index finger of a user, while the device is being operated to remove scales from a fish.

In use, scales of a fish are first loosened by grasping a fish to be scaled, by the head with its tail extending away from the user, and the teeth of the device applied near the tail of the fish and pulled toward the user, so that the teeth loosen scales and bend them up away from the fish body. When the scales on the fish have been loosened in this manner, by one or two quick passes along each side of the fish, the fish is reversed in the grasp of the left hand, so that the head extends away from the user of the device, whereat the removing edge of the device is pushed, away from the user and along the fish toward the head of the fish, and the loosened scales removed from each side of the fish, in one or more quick passes. It is usually necessary to loosen only two or three rows of scales near the tail of the fish, by means of the teeth, before applying the removing edge of the device for effectively stripping the scales from sides of a fish.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fish scaler comprising a handle having forward and rear ends, a head having a forward end and fixed on the forward end of the handle, said head being wider than the handle, said head having a transversely concaved undersurface spaced downwardly from the handle, said head having an upper surface which declines to the forward end of the head and meets the undersurface of the head to define a fish scale removing edge at the forward end of the head, and transversely spaced fish scale loosening teeth extending along the rear end of said undersurface and extending rearwardly from the head.

2. A fish scaler comprising a handle having forward and rear ends, a head having a forward end and fixed on the forward end of the handle, said head being wider than the handle, said head having a transversely concaved undersurface spaced downwardly from the handle, said head having an upper surface which declines to the forward end of the head and meets the undersurface of the head to define a fish scale removing edge at the forward end of the head, said handle having a side, and a concave thumb socket formed in said side and in the rear end of the head, and an index finger socket formed on the top of the head at the forward end of the handle, said index finger socket comprising an upstanding boss on the top of the head, said boss having a rear side having a concavity therein.

3. A fish scaler comprising a handle having forward and rear ends, an enlarged head fixed on said forward end and reaching below the handle, said head having a transversely concaved undersurface, said undersurface having forward and rear ends, and transversely spaced rearwardly projecting fish scale loosening teeth on and extending along the rear end of said undersurface.

4. A fish scaler comprising a handle having forward and rear ends, an enlarged head fixed on said forward end and reaching below the handle, said head having a transversely concaved undersurface, said undersurface having forward and rear ends, and transversely spaced rearwardly projecting fish scale loosening teeth on and extending along the rear end of said undersurface, said handle having a side edge, a thumb socket formed in said side edge and in the rear end of the head, and an index finger socket on the top of the head at the forward end of the handle.

5. A fish scaler comprising a handle having forward and rear ends, an enlarged head fixed on said forward end and reaching below the handle, said head having a transversely concaved undersurface, said undersurface having forward and rear ends, and transversely spaced rearwardly projecting fish scale loosening teeth on and extending along the rear end of said undersurface, said handle having a side edge, a thumb socket formed in said side edge and in the rear end of the head, and an index finger socket on the top of the head at the forward end of the handle, a central upstanding boss on the top of the head having a rearwardly facing concavity defining said index finger socket.

6. A fish scaler comprising a handle having a forward end, a head having forward and rear ends, an upper surface, and an undersurface, the forward end of the handle being joined to the head at its upper surface and rear end and being spaced upwardly from said undersurface, said upper surface declining forwardly and intersecting said undersurface to define a scale removing edge, said undersurface having a rear edge and side edges, and a row of scale loosening teeth extending along an edge of the undersurface.

7. A fish scaler comprising a handle having a forward end, a head having forward and rear ends, an upper surface, and an undersurface, the forward end of the handle being joined to the head at its upper surface and rear end and being spaced upwardly from said undersurface, said upper surface declining forwardly and intersecting said undersurface to define a scale removing edge, said undersurface having a rear edge and side edges, and a row of scale loosening teeth extending along an edge of the undersurface, a boss upstanding from the upper surface of the head at the forward end of the handle and having a finger receiving recess, a side of the handle and the rear end of the head having a thumb receiving recess.

References Cited in the file of this patent
UNITED STATES PATENTS

| | | |
|---|---|---|
| 407,562 | Agan | July 23, 1889 |
| 1,204,764 | Helmich | Nov. 14, 1916 |
| 2,338,647 | Koon | Jan. 4, 1944 |
| 2,536,065 | Kollander | Jan. 2, 1951 |
| 2,569,022 | Sagers | Sept. 25, 1951 |
| 2,795,006 | Stephenson | June 11, 1957 |